(No Model.) 2 Sheets—Sheet 1.
P. MUNDE.
FRUIT PICKER.
No. 603,918. Patented May 10, 1898.
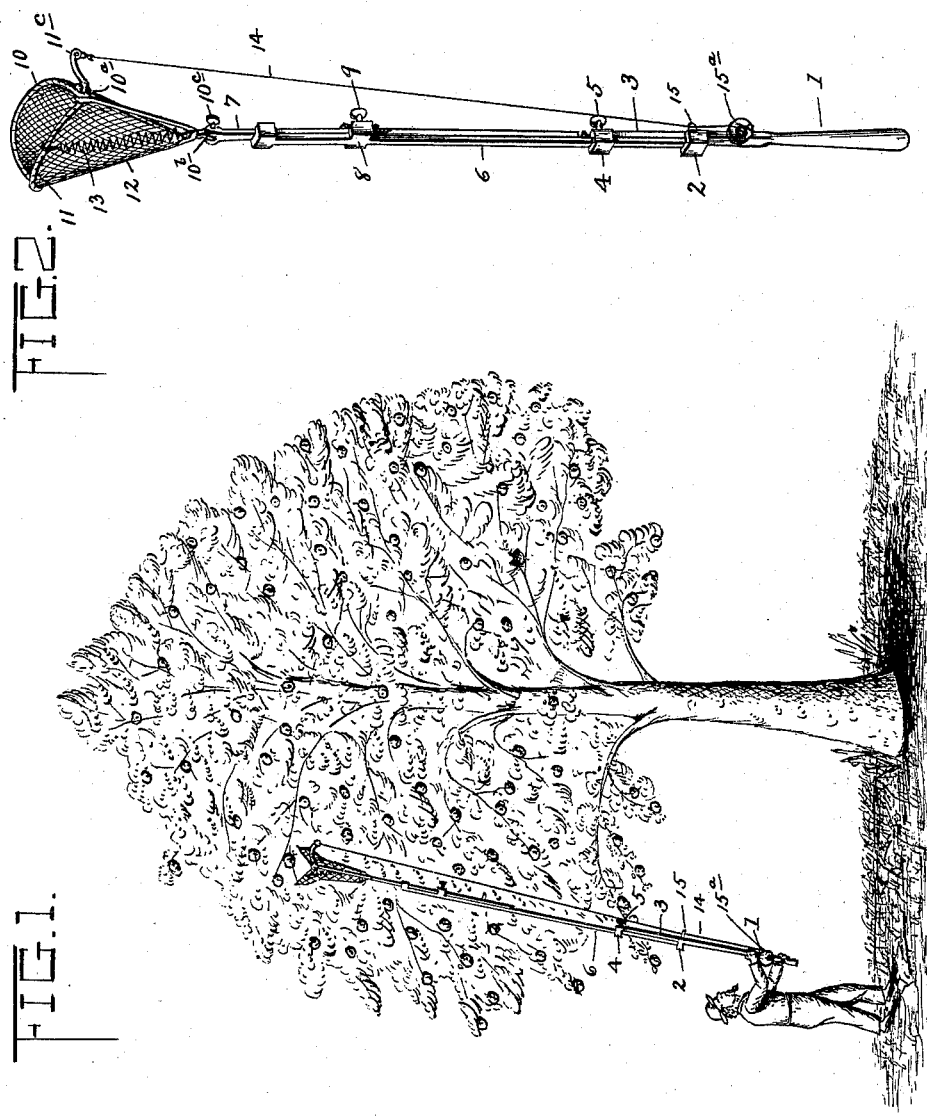
Witnesses
Saml R Turner
Gladys L. Thompson
Inventor
Patrick Munde.
By R.S.& A.B. Lacey,
Attorneys.

(No Model.) 2 Sheets—Sheet 2
P. MUNDE.
FRUIT PICKER.
No. 603,918. Patented May 10, 1898.
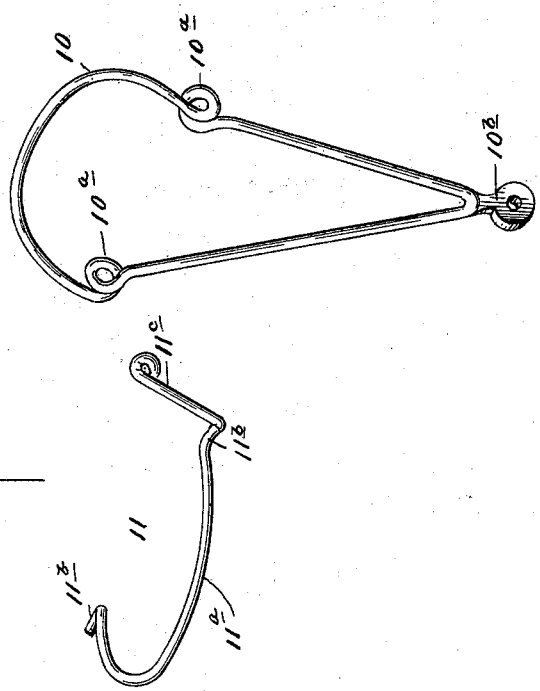
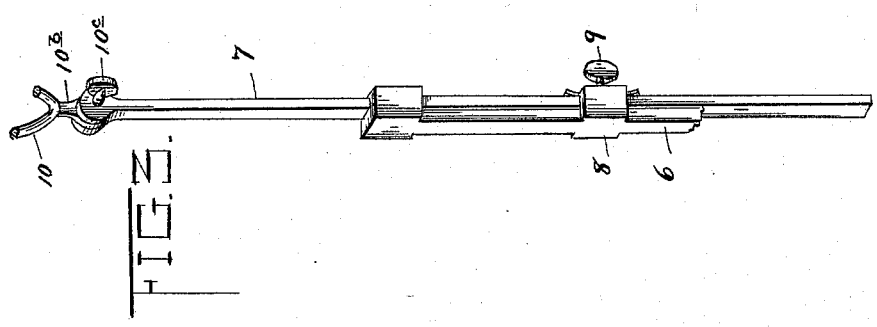
Witnesses
Sam R Turner
Gladys L. Thompson
Inventor
Patrick Munde.
By R.S.&A.P.Lacey,
Attorneys.

UNITED STATES PATENT OFFICE.

PATRICK MUNDE, OF EASTHAMPTON, MASSACHUSETTS.

FRUIT-PICKER.

SPECIFICATION forming part of Letters Patent No. 603,918, dated May 10, 1898.

Application filed August 13, 1897. Serial No. 648,119. (No model.)

*To all whom it may concern:*

Be it known that I, PATRICK MUNDE, a citizen of the United States, residing at Easthampton, in the county of Hampshire and State of Massachusetts, have invented certain new and useful Improvements in Fruit-Pickers; and I do hereby declare the following to be a full, clear, and exact description of the invention, such as will enable others skilled in the art to which it appertains to make and use the same.

My invention relates to improvements in fruit-pickers, and has for its object to provide a novel construction of extensible picker by means of which fruit on the upper and lower branches of a tree may be picked with equal ease and facility, and also to otherwise generally improve the construction and efficiency of devices of this character; and to this end the invention consists in the novel constructions, combinations, and arrangements of parts, hereinafter more fully described, and particularly set forth in the appended claim.

In the accompanying drawings, Figure 1 is a perspective view of a fruit-picker embodying my invention and illustrating its manner of use. Fig. 2 is also a perspective view, but shows the picker-sections collapsed. Fig. 3 is an enlarged detail view of the outer rod or joint-section and coacting parts. Fig. 4 shows a detail perspective view of the jaws detached.

Referring now more particularly to the drawings, 1 represents the handle of the picker, which is provided at its upper end with a socket 2, having an arm 3 projecting therefrom and carrying a guide-collar 4, provided with a set-screw 5.

6 represents a fixed rod having its lower end fitted in the socket 2 and extending through the said guide-collar and clamped thereto by the set-screw thereof. By releasing the set-screw this rod may be detached from the handle when the device is not in use and it is desired to pack or store the same in close compass.

One or more extensible rods or joint-sections 7 may be adjustably connected with the rod 6 in any suitable manner; but in the present instance I have shown the rod 6 provided at its upper end with a clamping sleeve or collar 8 to receive the lower end of the rod 7, said collar being provided with a set-screw 9 to clamp the same.

The rod 7 is forked or bifurcated at its outer end and carries a fruit picking and holding device consisting of a fixed jaw 10, a movable jaw 11, and a net, sack, or other suitable receptacle 12. The jaw 10 consists of an approximately triangular-shaped open frame of wire formed at opposite sides with eyes $10^a$ and having its upper end or jaw portion flared outwardly. At its lower end this frame is provided with a pivot-eye $10^b$, which is adapted to be received within the bifurcated outer end of the rod 7 and clamped thereto at any desired angle by a set-screw $10^c$.

The jaw 11 consists of a semicircular wire frame $11^a$, formed with pintles $11^b$, which have bearing in the eyes $10^a$ of the jaw 10, and a crank-arm $11^c$, projecting laterally therefrom. The said jaw 11 is thus adapted to open and close, and a spring 13 is provided to normally hold said jaw open to inclose the fruit. The sack or receptacle 12 has the general form of a cornucopia and is connected at its closed contracted end to the lower end of the frame of the jaw 10 and at its enlarged open end to both jaws 10 11, as shown. By this construction and arrangement it will be seen that the sack does not project unduly and cannot swing about and catch in the limbs or branches of the trees and so impede the fruit-picking operation. This sack or receptacle may be made of cord or wire-netting or of any other suitable material which will not bruise or otherwise injure the fruit thrown therein.

The movable jaw 11 is normally held in open or operative position by the spring 13, as before stated, and to close the same to confine the fruit a cord or flexible connection 14 is provided, said cord passing over a pulley 15 and having one end attached to the crank-arm $11^c$ of the jaw 11 and the other end thereof connected with a reel $15^a$ on the handle 1. By means of this reel the cord may be kept taut and drawn upon to close the jaw 11, if desired, or said jaw may be closed by grasping the cord in the hand and pulling it.

From the above description, taken in connection with the accompanying drawings, the operation of my improved fruit-picker will be readily understood. It will also be understood that by releasing the clamps the extensible rod 7 may be collapsed and fitted in the socket 2 and guide-collar 4 parallel with the rod 6 and clamped in such position, as shown in Fig. 2, or, if desired, the several sections of the picker may be disconnected for packing or storing in close compass.

By the employment of my picker fruit may be gathered from the upper branches of the tree with equal ease and facility as from the lower branches thereof, and the operation of the picker may be readily directed by a person standing on the ground.

Having thus fully described my invention, what I claim as new and useful, and desire to secure by Letters Patent of the United States, is—

A fruit-picker comprising, in combination, a handle 1 provided with a socket 2 having an arm 3 carrying a guide-collar 4 provided with a set-screw 5, a fixed rod 6 fitted in said socket and guide-collar and carrying a guide-collar 8, an extensible rod 7 sliding in said collar 8 and forked or bifurcated at its outer end, a stationary jaw consisting of an approximately triangular-shaped frame formed at its lower end with a pivot-eye fitted in the bifurcation of said rod and at its upper end with oppositely-disposed eyes and a semicircular-shaped, outwardly-flaring jaw, a set-screw on the rod engaging said pivot-eye, a semicircular movable jaw provided with pintles having bearing in said eyes and a crank-arm, a fruit-receiving sack attached at its open end to both jaws and at its lower end to the frame of the stationary jaw, a reel on the handle, and a cord connecting between said reel and crank-arm of the movable jaw, substantially as described.

In testimony whereof I affix my signature in presence of two witnesses.

PATRICK MUNDE.

Witnesses:
KIRK J. THURSTON,
GEORGE J. LANG.